United States Patent [19]
Kuddes et al.

[11] Patent Number: 5,274,785
[45] Date of Patent: Dec. 28, 1993

[54] ROUND ROBIN ARBITER CIRCUIT APPARATUS

[75] Inventors: David W. Kuddes, Richardson; Gregory J. Longendyke, Rowlett, both of Tex.

[73] Assignee: Alcatel Network Systems, Inc., Richardson, Tex.

[21] Appl. No.: 822,030

[22] Filed: Jan. 15, 1992

[51] Int. Cl.$^5$ .............. G06F 13/14; G06F 13/36
[52] U.S. Cl. .................. 395/325; 395/725; 364/242.6; 364/242.92; 364/270.3; 364/271.5; 364/242.7; 364/DIG. 1; 370/85.2; 370/85.6; 340/825.5
[58] Field of Search .......... 395/725, 325, 425, 550, 395/275; 340/825.5, 825.51; 370/85.2, 85.6

[56] References Cited

U.S. PATENT DOCUMENTS

| | | | |
|---|---|---|---|
| 4,096,572 | 6/1978 | Namimoto | 364/200 |
| 4,380,052 | 4/1983 | Shima | 364/900 |
| 4,641,266 | 2/1987 | Walsh | 364/200 |
| 4,779,089 | 10/1988 | Theus | 340/825.5 |
| 4,881,195 | 11/1989 | Delong et al. | 364/900 |
| 4,896,266 | 1/1990 | Klashka et al. | 364/200 |
| 4,991,084 | 2/1991 | Rodiger et al. | 364/200 |
| 5,038,276 | 8/1991 | Bozzetti et al. | 364/200 |
| 5,046,075 | 9/1991 | Kraemer et al. | 375/119 |
| 5,072,363 | 12/1991 | Gallagher | 395/725 |
| 5,081,578 | 1/1992 | Davis | 395/325 |
| 5,088,024 | 2/1992 | Vernon et al. | 395/725 |
| 5,140,680 | 8/1992 | Best | 395/325 |
| 5,168,568 | 12/1992 | Thayer et al. | 395/725 |

*Primary Examiner*—Gopal C. Ray
*Attorney, Agent, or Firm*—Bruce C. Lutz; Dennis O. Kraft

[57] ABSTRACT

A circuit is shown for arbitrating between inputs to provide all request inputs with the opportunity to be polled in substantially less time than is the case with known prior art round robin arbiters. This is accomplished by phase delaying the input clock to produce a plurality of different phase clock signals such that multiple arbiter circuits can be polled within a single clock cycle if the first few arbiter circuits do not have a request waiting. With proper speed of operation of arbiter circuits, the phase delay can be of a short enough duration that all of the arbiter circuits can be polled in a single clock cycle. With slower speed arbiter circuits, the total polling time can exceed one clock cycle but still be less than the number of clock cycles of prior art round robin circuits which typically was the number of arbiter circuits times a single clock cycle time duration.

7 Claims, 3 Drawing Sheets

ROUND ROBIN ARBITER CIRCUIT APPARATUS

THE INVENTION

The present invention is generally concerned with electronics and more specifically with arbitration circuits. Even more specifically, the invention is concerned with a round robin-type arbitration circuit.

BACKGROUND

When there is a single asset or resource, such as a personal computer data bus, that needs to be used by a plurality of requesters, such as a modem, a hard disk and/or a software program, some kind of allocation scheme needs to be provided. If no one is in an extreme hurry, a round robin scheme has been used in the past where, on a given clock cycle, one device request line is polled to ascertain whether or not that requester or device has a need for the asset and if there is a request, the request is granted for an indeterminate time. After that request is removed or finished, the system proceeds to the next requester in line. If someone far down the line of requesters in the round robin circuit has a request even though no one else has a request between the present arbitration logic circuit and the one connected to a requester requiring access to the asset, it still in the prior art, has required a number of clock signals equal to the number of intermediate requesters to get to the requester having a present need to acquire the use of the asset.

For this reason, most present-day schemes for determining who gets access to an asset, use a priority interrupt scheme where the requester with the most priority, is always the next one to have access to the asset. Unfortunately, with such a scheme, a requester with low priority sometimes needs to wait an extremely long time before being granted access to an asset.

The present scheme uses a round robin approach to assure everyone equal access opportunity but provides for a substantial decrease in time to perform the round robin cycle times by providing a plurality of different phase clock signals for each of N arbitration circuits so that the round robin cycle for N arbitration circuits can be completed in less than N clock duration times. With the proper circuitry, the entire round robin cycle can be completed within one clock duration time period if there are no active requests.

The scheme referenced above can be easily modified to provide for giving at least one of the requesters a priority interrupt for interrupting any other requester's use of an asset and then allowing the system to return to the round robin scheme after the priority requester has completed his use of the asset.

It is therefore an object of the present invention to provide an improved arbitration circuit using a round robin approach with phase delayed clock signals to improve the access time of the round robin scheme.

Other objects and advantages of the present invention will be apparent from a reading of the specification and appended claims in conjunction with the drawings wherein:

DETAILED DESCRIPTION

Figure 1:
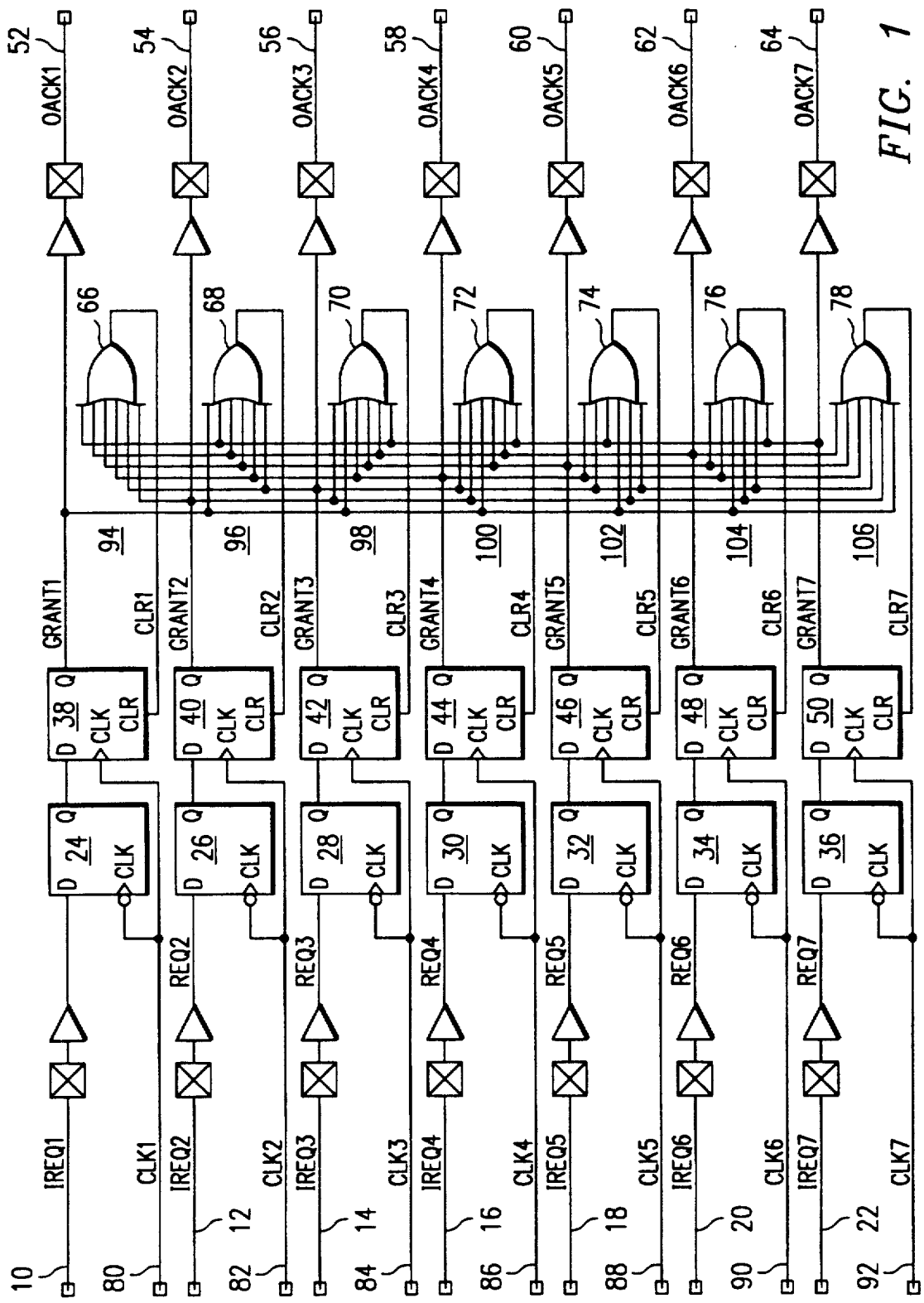
FIG. 1 is a block schematic diagram of the basic arbitration circuit.

In FIG. 1 a series of N request lines 10 through 22 are applied through appropriate input buffer devices to flip-flops designated 24 through 36. Each of these flip-flops 24 through 36 are supplied to further corresponding flip-flops 38 through 50. As shown, N equals 7 for this embodiment of the invention. The outputs of each of the flip-flops 38 through 50 are connected via buffer circuits to grant output leads 52 through 64. In addition, there is shown OR gates 66 through 78. The outputs of gates 66 through 78 are connected back respectively, to the CLR (clear) or inhibit inputs of each of flip-flops 38 through 50. The grant outputs of each of the flip-flops 38 through 50 are not only connected to the grant outputs 52 through 64 but connected to the OR inputs of each of the OR gates 66 through 78 other than the OR gate connected to its clear input. In other words, the grant output of clock 38 has the output of OR gate 66 connected to its clear input. Thus, the output of flip-flop 38 is connected to the inputs of OR gates 68 through 78. In the same manner, the output of flip-flop 40 is connected to OR gates 66 and 70 through 78 since the output of OR gate 68 is connected to the clear input of flip-flop 40. Each of the flip-flops 24 through 50 is connected to a clock input with the clock inputs being designated from 80 through 92. The flip-flop 38, in combination with OR gate 66, is designated as arbiter circuit 94. The remaining flip-flops 40 through 50 and associated OR gates 68 through 78 are given arbiter circuit designations 96 through 106. The flip-flops 24 through 36, are designated as metastable stages for converting the asynchronous signals-to-signals synchronized with the clock signals applied to that stage and are not considered to be part of the arbitration circuits.

Figure 2:
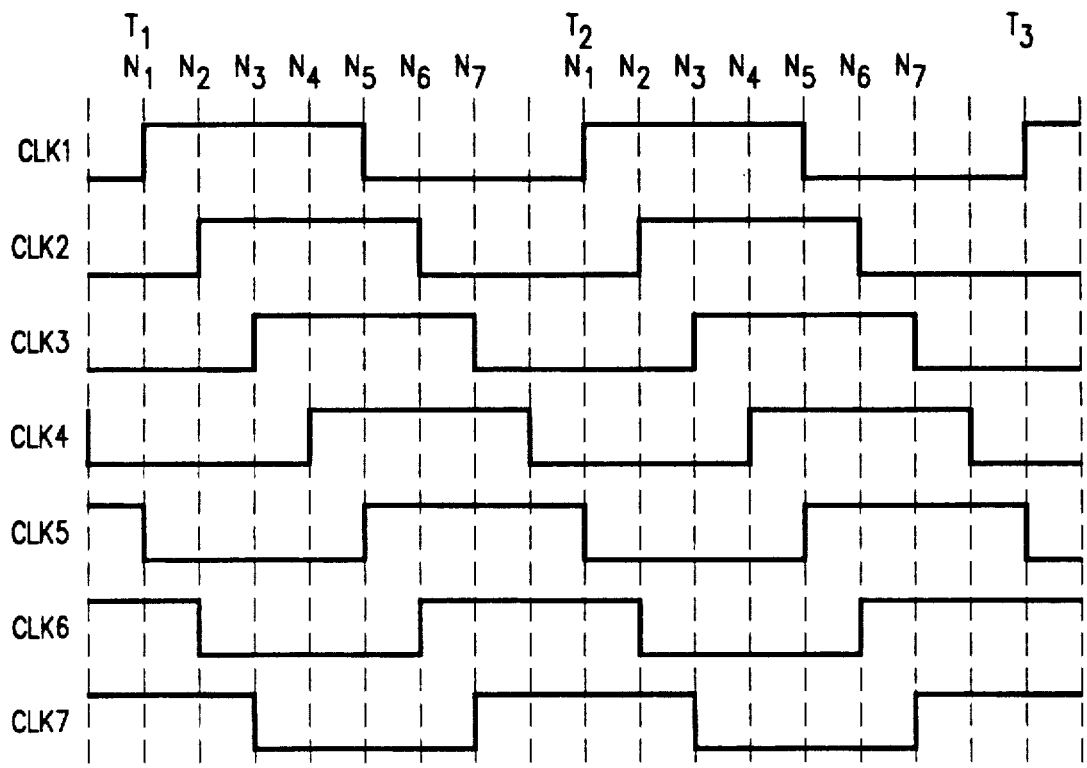
FIG. 2 is a collection of waveforms showing the phase delay set of clock signals which may be obtained from a single clock passed through a digital delay line.

In FIG. 2 the signal waveforms labeled clock 1 through clock 7 correspond respectively to the clocks supplied on leads 80 through 92 in FIG. 1. It will be noted that the time duration of a single clock is from time T1 to time T2. The delay of clocks 1 through 7 in one embodiment of the invention may be such as illustrated with the time between N1 and N2 being the first delay and the time from N2 to N3 being the second delay, etc. As will be noted, the time delay between N1 and N2 is not the same as the time delay between N7 and time T2. In other words, it is not necessary that the delays be symmetrical, only that a set of arbitration circuits have unique phases, one with respect to the other. It may be noted that clock 5 can be generated by merely inverting clock 1, and clock 6 can be generated by merely inverting clock 2.

Figure 3:
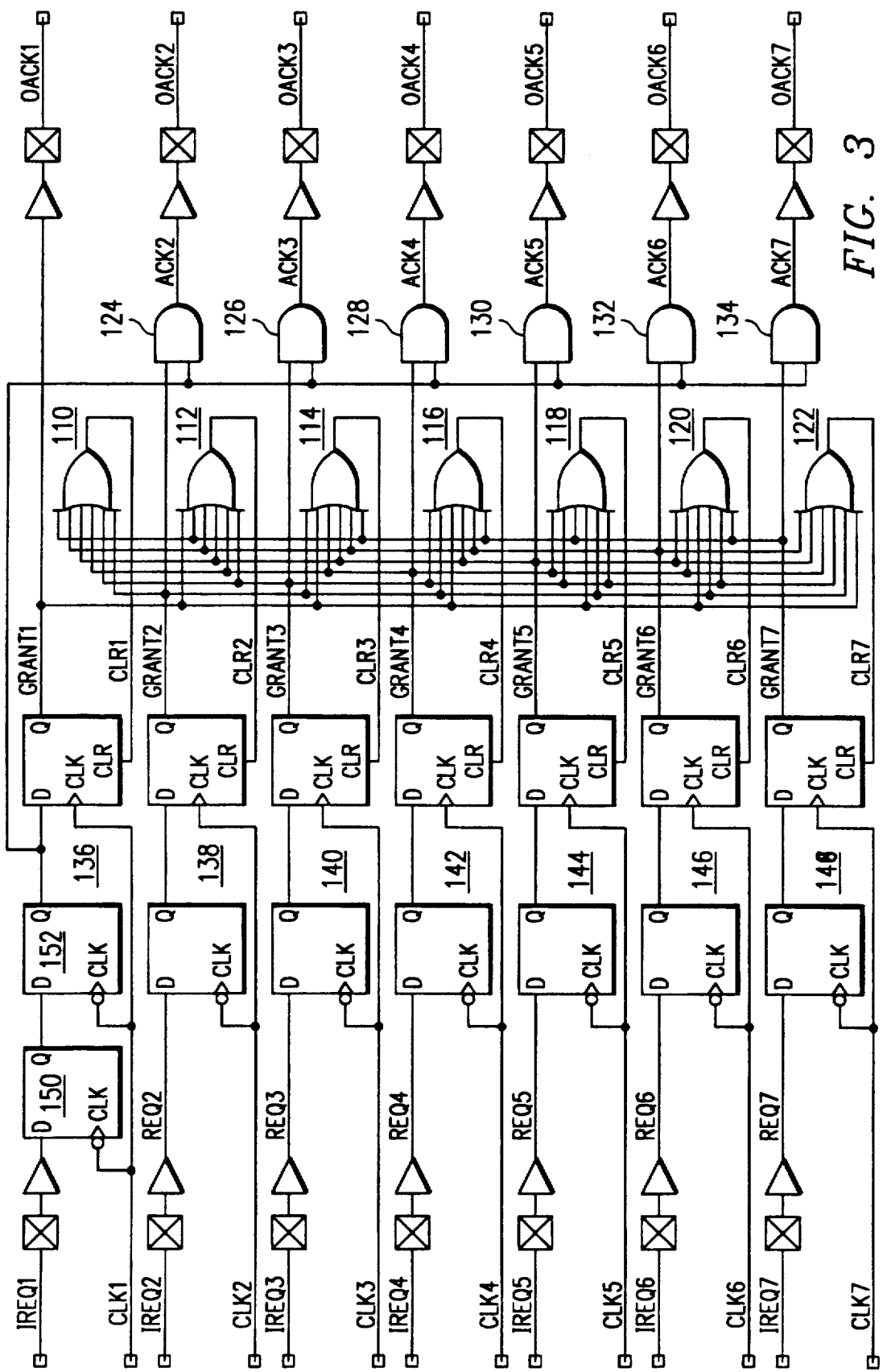
FIG. 3 is a modification of FIG. 1 wherein requester 1 has priority over all other requesters.

FIG. 3 is very similar to FIG. 1 except for the addition of a flip-flop in the one request line having priority (IREQ1) and the addition of NAND gates in the output line of all the arbitration circuits not having priority.

In FIG. 3 arbitration circuits are generally designated as 110 through 122. The added NAND gates are designated as 124 through 134. Pairs of input flip-flops corresponding to that of FIG. 1 are designated as 136 through 148 and the metastable stage flip-flop 150 and additional flip-flop 152 are designated as illustrated. The request lines for arbitration circuits 110 through 122 are designated as IREQ1 through IREQ7 and similarly, the seven different phase clock signals are designated CLK1 through CLK7. The grant outputs are listed as grant1 through grant7 and the CLR inputs of each of the flip-flops in the sets from 136 through 148 are labeled as shown.

Figure 4:
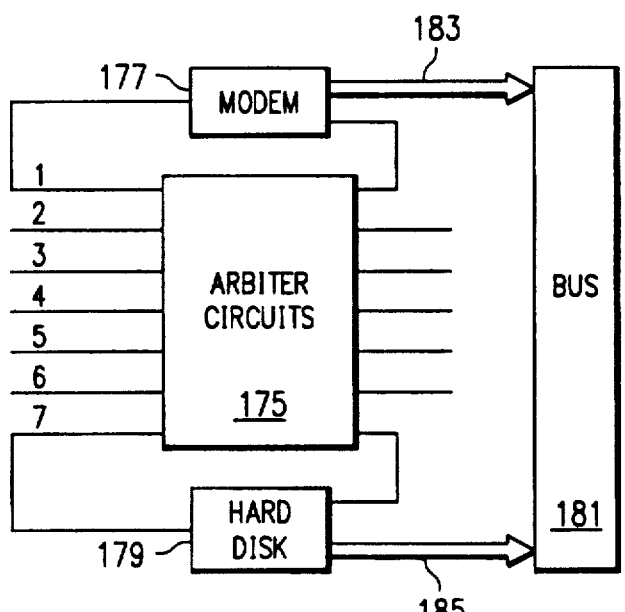
FIG. 4 is a block diagram of an arbiter circuit as it might be used in a practical application.

FIG. 4 illustrates a practical application of an arbiter circuit 175 in connection with requesters such as a modem 177 and a hard disk 179 both of which are trying to access a personal computer asset such as a data bus 181. The arbiter circuit 175 is shown as having seven request inputs with the modem utilizing request number 1, and the hard disk utilizing request number 7. As will be realized, additional requests might be input from software or a DMA on other leads but are not shown for the purpose of keeping the illustration simple. As illustrated, parallel bus 183 supplies data between the modem 177 and bus 181 while a further set of parallel lines 185 transmits data in both directions between hard disk 179 and the bus 181.

OPERATION

The design of the present arbiter is "device dependent". In other words, for the purposes of this discussion, it may be assumed that the device making a request does not provide any action until it gets an acknowledgement. If, for whatever reason, the acknowledgement disappears, the device will wait or "time out" and if the acknowledgement does not re-appear, will remove its request signal and no longer use the device to which it was granted access by the acknowledge signal. While other types and designs of peripheral devices may use slightly different procedures in making requests and obtaining grants, the basic operation of the arbiter would still be the same.

Using the aforementioned concept of the peripheral making a request and not accessing a data bus (not shown) until receipt of an acknowledgement, it may be ascertained that, if a request is made on input lead 16 and lead 16 is the only lead having a request signal in FIG. 1, then clock 1 on lead 80 would attempt to activate flip-flops 24 and 38 of arbiter 94 but not succeed. Since there was no request signal at time N2, the flip-flops of arbiter 96 would also not be activated. Again, with no IREQ3 request signal, the apparatus would continue at time N3 to arbiter 98 and again not activate the flip-flops. However, at time N4, flip-flop 30 would be activated due to the simultaneous occurrence of a rising pulse on the input clock from lead 86 and the previous occurrence of a request on lead 16 to the D input of flip-flop 30. This would soon thereafter change the Q output of flip-flop 30 to a logic "1", but this would be after the rising pulse of the clock which had already been applied to the clock input of flip-flop 44. The clock signals would be applied at times N5, N6 and N7 to the clock inputs of the flip-flops for the remaining arbiter circuits. Since it was assumed that arbiter 100 was the only one having any request signal, nothing further would happen. Even if a request now appeared at one of the other arbiter circuits such as arbiter 96, this would merely activate the metastable flip-flop 26 at time N2 after time T2 and not actually activate the arbiter circuit 96. At time N4, after time T2, it would be found that flip-flop 44 has a positive or logic "1" input at the D input as well as a rising pulse at the clock input, and this would then provide a grant output on lead 58. The occurrence of this output would be applied to all of the OR circuits 66 through 70 and 74 through 78 to clear the D flip-flops 38 through 42 and 46 through 50. Thus, on the N2 time after T3, the clock signal will not activate flip-flop 40 since there is a clear input preventing or inhibiting it from being activated. The arbiter circuit 100 will continue providing an output on lead 58 until the device making the request has finished using the bus at which time the signal on lead 16 will drop to a logic "0" and as of the following N4 time period, the output from flip-flop 30 will change to logic "0", and with the following N4 time period, the flip-flop 44 will provide a logic "0" output thereby de-activating the OR gates previously activated and releasing the clear signal from the remaining flip-flops 38 through 42 and 46 through 50. The set of arbiter circuits of FIG. 1 is now available to receive a request input on any of the request input leads 10 through 22.

If, instead of the previous assumed condition, it were assumed that both leads 16 and 22 had an input request appear at the same time, it would be realized that flip-flop 30 would provide a Q output at the first clock occurring thereafter at the N4 time period. Immediately thereafter at the N7 time period, flip-flop 36 would provide a logic "1" output. However, since flip-flops 38 through 50 are not activated until the following clock cycle, flip-flop 50 would be activated at the next N4 time period. The requester number 4 would use the bus until finished and then release the logic "1" input on lead 16. All during this time, the flip-flop 36 will maintain a logic "1" output to the D input of flip-flop 50. Thus, as soon as the clear output is removed from each of the flip-flops, the arbitration circuits 102 and 104 are polled to see if they have any request inputs. Since under the assumed conditions, the D flip-flop 50 will be activated in the next clock cycle during the N7 time period thereof, requestor number 7 does not have to wait the three clock time cycles of the prior art.

There are times that it is essential to have a priority interrupt even though a majority of the circuits can successfully use a round robin technique. An example of this is a personal computer where it is often essential that the modem such as 177 in FIG. 4 have instantaneous access to the data bus 181. While the modem can have enough memory to store some incoming information, and can wait a few clock cycles, it often can't wait very long. Thus, it would be desirable if another circuit such as software or a hard disk such as 179 in FIG. 4 is presently utilizing the bus 181 that it be interrupted so that the modem 177 can proceed. FIG. 3 illustrates a way in which such an interruption can be handled by the modem while allowing all the rest of the arbiter circuits to operate in a normal round robin approach and still maintain the very time efficient approach of the present invention to quickly scan all the requesting circuits in a minimal amount of time. The metastable flip-flops 24 through 36 in FIG. 2 are utilized to prevent hits or disturbance signals from appearing at the outputs 52 through 64. In FIG. 3, flip-flop 150 continues to perform this same metastable function. Additional flip-flop 152 is designed to provide a synchronized output for use in providing priority access to the bus. The output of flip-flop 152 is supplied to each of the NAND gates 124 through 134. If arbitration circuit 116 has been activated and has been providing an output due to the request on IREQ4 and a request is now supplied to flip-flop 150, it will supply a logic "1" output to flip-flop 152 at the next N1 time period of a clock cycle. The following N1 time flip-flop 152 will be activated and remove the acknowledge signal from each of the outputs QACK2 through QACK7. If the device requesting acknowledgement has a built-in time-out apparatus as was previously assumed, it will remove the request signal from input IREQ4 after a predetermined period of time, thus removing the clear signals from each of the flip-flops 136 through 140 and 144 through 148. Since the output of flip-flop 152 is at a logic "1", the next N1 period following the removal of the clear signal to the second flip-flop of pair 136 will result in a grant output being provided on the grant1 output and thus, to the OACK1 output lead whereby the device requesting this priority input is granted access to the bus. At the same time, an output will be provided to each of the OR gates in the remaining arbiter circuits so as to apply a clear signal to the second flip-flop of each of these circuits thereby preventing any further requests from being responded to until device number 1 is finished.

Logic circuitry could be provided to allow the arbiter circuits to continue from either the circuit previously having possession of the bus or the following arbiter circuit if so desired. However, such logic circuitry has not been illustrated and the circuit, as shown, would proceed to the arbiter's circuit having flip-flops 138 after arbiter circuit 136 has completed its tasks. If arbiter circuit 138 did not have a request input, it would proceed on the basis previously described in connection with FIG. 1 until a request input was found and the round robin arbiter would continue in the process described in connection with FIG. 1 until another priority interrupt occurred from requester number 1.

As previously indicated, round robin arbiters are old in the art and are not generally used because of the time required to get from the first arbitration circuit, such as IREQ1, to the last circuit such as IREQ7 is excessive, if these are the only two requesting access. As illustrated, this would require at least seven clock cycles between the time that requester number 1 has no longer use of the asset to the time that requester 7 is able to acquire access under the prior art designs. With the present inventive concept using the phase delays assumed in FIG. 2 and having circuitry with short enough time constants to utilize the illustrated phase delay, the device connected to arbitration circuit 148 could have access to the bus within one T1-T2 time cycle after release of the asset by requester 1.

Further, priority interrupts can be provided as illustrated in connection with FIG. 3, and more than one interrupt could be interspersed with regular round robin circuitry as desired with appropriate logic circuitry.

While I have illustrated one approach of a round robin arbiter using phase delay clocks to decrease the time between distantly positioned request circuits, I wish to be limited not by the specific circuitry illustrated, but only by the general concept of a phase delay set clock signals applied to a set of arbiter circuits which requires less than N times a clock cycle duration to check the request lines of all associated requesting devices where N is the number of arbitrater circuits as defined in the appended claims wherein I claim:

1. Arbiter apparatus for round robin arbitrating with N arbiter circuits where N is a positive member greater than 2 comprising, comprising:
   clock signal supply means for supplying a primary clock signal with a given repetition period;
   delay means, connected to said clock means, for providing N−1 additional clock signals each incrementally phase delayed with respect to said primary clock signal such that all N−1 additional clock signals are initiated within one said given repetition period as different phase clock signals;
   N arbiter circuits, each including clock input means, request input means, clear means and grant output means;
   N request input signal means connected respectively to each of said request input means of said N arbiter circuits, said N request input signal means initiates activation of said respective N arbiter circuit;
   each of said N arbiter circuits operable to receive said different phase clock signal from said clock means via said clock input means;
   each of said arbiter circuits further operable to provide a grant output signal in response to said clock input means, said request input means, and said clear means;
   N logic circuits means each coupled respectively to each of said arbiter circuits and operable to control said clear means of said arbiter circuit; and
   means connecting one of said N logic circuit means to each of said N arbiter circuits for monitoring the grant output means of that arbiter circuit for the occurrence of a grant output signal and connecting each of the logic circuits to the clear means of all the arbiter circuits other than the one being monitored for preventing the activation of any of the other arbiter circuits for as long as a request input signal is applied to the circuit having a grant output signal.

2. A method of minimizing the clock cycle time for round robin arbitrating between request inputs to a plurality of arbiter circuits in a system and providing a single grant output signal at a time from the plurality of arbiter circuits each having an associated request input, arbiter clearing signal input and grant output, the method comprising the steps of:
   providing phase delay clocking to each of N arbiter circuits for completing enablization thereof whereby each of said N arbiter circuits successively receives a clock signal in less than N clock cycles, N being a positive number greater than 2, the N arbiter circuits operable to provide a grant output signal;
   providing request signals to said arbiter circuits whereby the next clocked arbiter circuit having a request signal applied thereto, after arbiter clearing signals are removed, is allowed to provide a grant output signal;
   monitoring the grant outputs of each of the arbiter circuits; and
   keeping each remaining arbiter circuits from responding to an associated request input signal until after the associated request signal is removed from the arbiter circuit presently providing a grant output signal.

3. An apparatus for minimizing the clock cycle time for round robin arbitrating between request inputs to a plurality of arbiter circuits and providing a single grant output signal at a time from the plurality of arbiter circuits each having an associated request input, arbiter clearing signal input and grant output, comprising
   N arbiter circuits each including clock input means, clear input means, request input means and grant output means, N being a positive number greater than 2, said N arbiter circuits operable to provide a grant output signal;
   clock first means for providing phase delay clocking to said clock input means of each of said N arbiter circuits for completing enablization thereof whereby each of said N arbiter circuits successively receives a clock signal in less than N clock cycles;

second means for providing request signals to said request input means of at least one of said arbiter circuits whereby the next clocked arbiter circuit having a request signal applied thereto, after arbiter clearing signals are removed, is allowed to provide a grant output signal;

third means for monitoring the grant outputs of each of the arbiter circuits; and fourth means connected to said clear input means of said N arbiter circuits for keeping each remaining arbiter circuits from responding to an associated request input signal until, after the associated request signal is removed from the arbiter circuit presently providing a grant output signal.

4. A method of minimizing the clock cycle for round robin arbitrating between request inputs to a plurality of arbiter circuits in a system and providing a single grant output signal at a time from the plurality of arbiter circuits each having an associated request input, arbiter clearing signal input and grant output, the method comprising the steps of:

successively phase delay clocking each of N arbiter circuits for completing enablization thereof whereby each of said N arbiter circuits receives a clock signal in a total time of less than N clock cycles, N being a positive number greater than 2, the N arbiter circuits operable to provide a grant output signal;

providing request signals to said arbiter circuits whereby the next clocked arbiter circuit having a request signal applied thereto, after arbiter clearing signals are removed, is allowed to provide a grant output signal;

monitoring the grant outputs of each of the arbiter circuits; and maintaining a clear signal on all remaining arbiter circuits, other than one having a grant output signal for keeping each remaining arbiter circuits from responding to an associated request input signal, until after the associated request signal is removed from the arbiter circuit presently providing a grant output signal.

5. An apparatus for minimizing the clock cycle time for round robin arbitrating between request inputs to a plurality of arbiter circuits and providing a single grant output signal at a time from the plurality of arbiter circuits, comprising:

a plurality N of arbiter circuits each having a request input, an inhibit input, an activation input and a grant output, N being a positive number greater than 2, the N arbiter circuits operable to provide a grant output signal;

means connected to said activation inputs of each of said N arbiter circuits for supplying a plurality N of unique phase clock signals thereto; and N logic means, one of which is associated with each of said N arbiter circuits, and each of which is connected to the inhibit input of each of the remaining of said N arbiter circuits, for inhibiting active response of the remaining arbiter circuits while the associated arbiter circuit is actively responding to a request input.

6. Arbitration apparatus as claimed in claim 5 comprising, in addition:

deactivation means connected to N−1 arbiter circuits for deactivating the N−1 arbiter circuits in response to a request input being supplied to the remaining arbiter circuit of said N arbiter circuits for giving said remaining arbiter circuit priority during normal round robin arbitration operation.

7. A method of minimizing the clock cycle time for round robin arbitrating between request inputs to a set of arbiter circuits in a system, each having a request input, an inhibit input, an activation input and a grant output, where the set provides a single grant output signal at a time to one of several requesters, the method comprising the steps of:

supplying a plurality N of unique phase clock signals one to the activation inputs of each of a set of N arbiter circuits, N being a positive number greater than 2; providing request signals to said arbiter circuits; and logically inhibiting each of the remaining ones of the set of N arbiter circuits other than whichever one arbiter circuit is responding to a request input for as long as said one arbiter circuit is providing a grant output.

* * * * *